(12) United States Patent
Stewart

(10) Patent No.: US 8,279,842 B2
(45) Date of Patent: Oct. 2, 2012

(54) ROUTE SELECTION SYSTEM AND METHOD FOR PROMOTING ROUTE DISTRIBUTIONS AMONG MULTIPLE DEVICES IN A WIRELESS MESH NETWORK

(75) Inventor: Damon M. Stewart, Provo, UT (US)

(73) Assignee: Digi International Inc., Minnetonka, MN (US)

( * ) Notice: Subject to any disclaimer, the term of this patent is extended or adjusted under 35 U.S.C. 154(b) by 594 days.

(21) Appl. No.: 12/467,530

(22) Filed: May 18, 2009

(65) Prior Publication Data

US 2010/0290441 A1    Nov. 18, 2010

(51) Int. Cl.
*H04W 4/00* (2009.01)
(52) U.S. Cl. .................. 370/338; 370/400; 709/238
(58) Field of Classification Search .................. None
See application file for complete search history.

(56) References Cited

U.S. PATENT DOCUMENTS

| | | | |
|---|---|---|---|
| 6,633,544 B1 * | 10/2003 | Rexford et al. | 370/238 |
| 7,606,176 B2 * | 10/2009 | Joshi et al. | 370/255 |
| 2005/0122955 A1 * | 6/2005 | Lin et al. | 370/351 |
| 2008/0069034 A1 * | 3/2008 | Buddhikot et al. | 370/328 |
| 2008/0267116 A1 * | 10/2008 | Kang et al. | 370/328 |
| 2008/0298250 A1 * | 12/2008 | Larsson | 370/238 |
| 2009/0238109 A1 * | 9/2009 | Byard et al. | 370/328 |
| 2010/0014444 A1 * | 1/2010 | Ghanadan et al. | 370/310 |
| 2010/0188971 A1 * | 7/2010 | Chiang | 370/225 |

OTHER PUBLICATIONS

Aguayo, Daniel, et al., "Link-level Measurements from an 802.11b Mesh Network", SIGCOMM '04, Aug. 30-Sep. 3, 2004, Portland, Oregon (2004), 11 pp.

Kim, Kyu-Han, et al., "On Accurate Measurement of Link Quality in Multi-hop Wireless Mesh Networks", MobiCom '06, Sep. 23-26, 2006, Los Angeles, California, (2006), 38-49.

* cited by examiner

*Primary Examiner* — Hassan Kizou
*Assistant Examiner* — Robert A Shand
(74) *Attorney, Agent, or Firm* — Schwegman Lundberg & Woessner, P.A.

(57) ABSTRACT

In a mesh network having a plurality of wireless nodes, including a first, second, third and fourth node, wherein each node includes a routing table, a method of route discovery. A first route request message is broadcasted from the first node and received at the second and third nodes. In the second node, a link quality metric is calculated as a function of link quality of the link to the first node and as a function of capacity in the routing table of the second node. In the third node, a link quality metric is calculated as a function of link quality of the link to the first node and as a function of capacity in the routing table of the third node. A second route request message is broadcasted from the second node and received by the fourth node, wherein the second route request message includes the link quality metric calculated by the second node. A third route request message is broadcasted from the third node and received by the fourth node, wherein the third route request message includes the link quality metric calculated by the third node. A route path is selected as a function of the link quality metric calculated by the second node and the link quality metric calculated by the third node.

18 Claims, 5 Drawing Sheets

ROUTE SELECTION SYSTEM AND METHOD FOR PROMOTING ROUTE DISTRIBUTIONS AMONG MULTIPLE DEVICES IN A WIRELESS MESH NETWORK

Disclosed embodiments relate generally to route selection in wireless mesh networks.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

DETAILED DESCRIPTION

Figure 1:
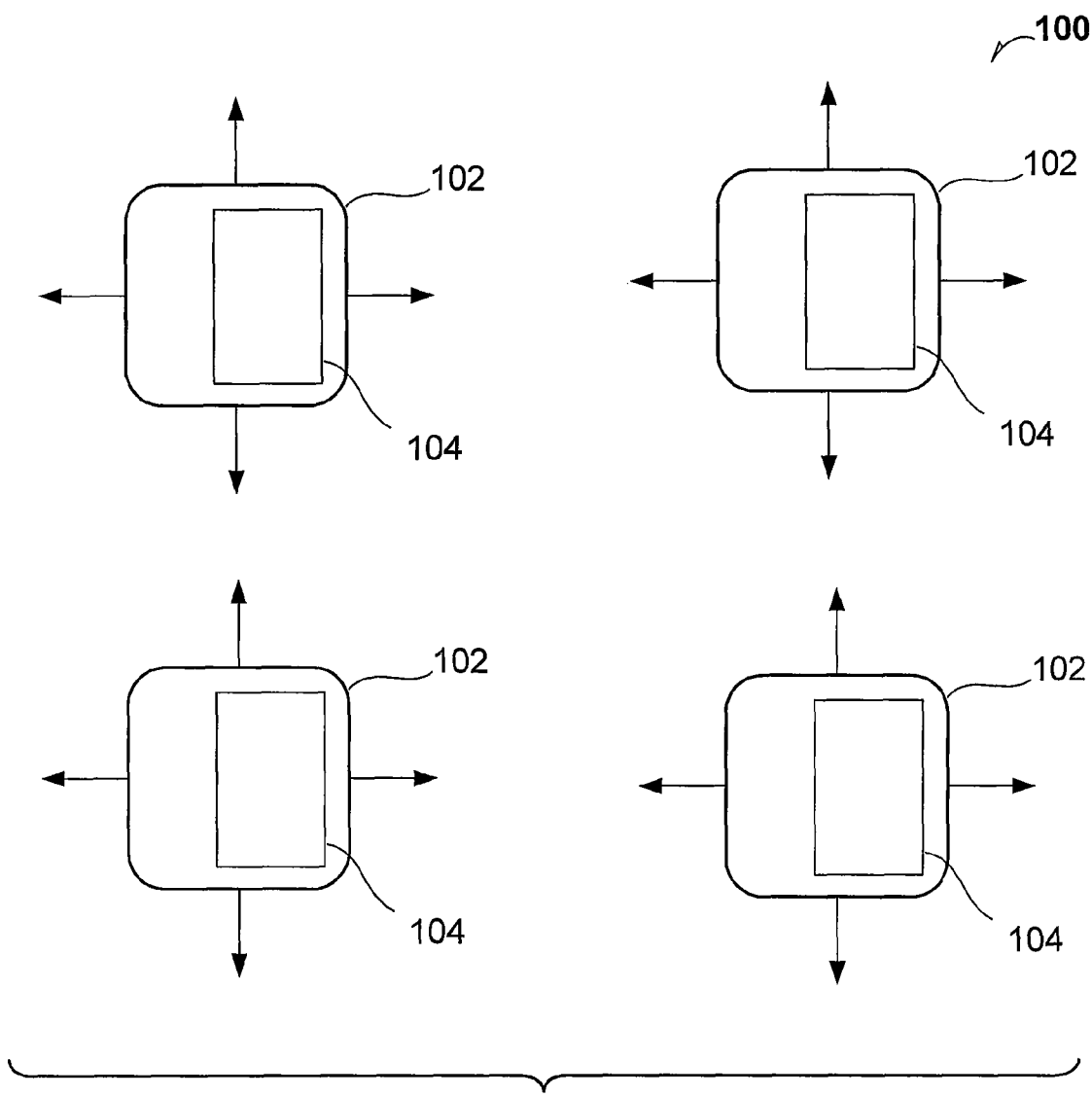
FIG. 1 is a schematic of a routing table for a given device in a mesh network according to an example embodiment.

In the following detailed description of example embodiments, reference is made to specific example embodiments by way of drawings and illustrations. These examples are described in sufficient detail to enable those skilled in the art to practice the delineated embodiments, and serve to illustrate how the embodiments may be applied to various purposes. Features or limitations of various embodiments described herein, however essential to the example embodiments in which they are incorporated, do not limit other embodiments, and any reference to the disclosed embodiments, their elements, operation, and application do not limit the embodiments but serve only to define these example embodiments.

In a routing-table-based mesh network, routes are formed as needed to send data from one device to a destination. Mesh routing allows data to "hop" through multiple devices, where each device relays the data packet towards the ultimate destination. One such routing-table-based mesh network is an Ad-hoc On-demand Distance Vector (AODV)-based mesh network. In an AODV-based mesh network, a route must be discovered before data can be routed to the ultimate destination. Devices are selected to be part of a route based on a metric that indicates some aspect of the quality of the link between any two nodes. Devices with a better link quality value are chosen over devices with poorer link quality.

Each broadcast route request (discovery) packet and each unicast route reply (response) packet includes a link quality field. This field is intended to indicate the quality of an overall path as it is established from source to destination. When a device receives a route request packet, and it is not the destination device, it reads the link quality field and modifies it based on certain criteria. It then inserts this adjusted link quality field into the route request and rebroadcasts the route request. If the destination device receives a route request packet, it evaluates the link quality field. If the received route request packet has the best link quality criteria of any received route request packet, the destination device sends a route reply to the device from which it received the route request. Otherwise, if the link quality metric in the received route request is worse than the best received link quality, the route request is discarded.

The criteria used by a device to determine the value to place in the link quality field has a direct impact on how routes will be created in the network. In practice, link quality selection criteria in many implementations is based solely on either received signal strength (RSSI) or silence value. The RSSI is a value that represents the total power observed by the radio hardware in the receiving node while receiving the frame, including signal, interference and background noise. The silence value reflects the total power observed just before the start of the frame representing the route request packet.

A metric based on signal quality alone tends to cluster routes since, if one device has better RSSI than its neighbors, for example, during route discovery, it could likely be selected again and again when weighed against the same neighbors. Selecting the same device or devices repeatedly to establish various routes results in a number of problems, including unequal route distribution, oversubscribing the route table of the high RSSI nodes and an increase in the amount of route discovery needed.

The link quality approach can lead to unequal route distribution, for instance, since the routing table of one device will fill up quickly if it is chosen repeatedly over its neighbors. While the routing table of one device fills up, neighboring devices equally capable of routing data may have nearly empty routing tables and be underutilized. This can, in turn, lead to increased collisions (multiple transmissions through the same device).

In addition, if a device is used for many routes, its finite length routing table can fill up. When this happens, the device must either remove routing table entries to free up space for new routes, or it can no longer be considered for establishing future routes.

Finally, if a routing table entry is removed from a routing table, future transmissions along that route will fail, requiring a new route discovery to occur to repair the broken route. Each route discovery is sent as a broadcast transmission to all devices in the network. Because of the nature of broadcast transmissions in a mesh network, route discoveries become a burden on the network and should be avoided as much as possible.

A mesh network according to one aspect of the present invention is shown in FIG. 1. In the network of FIG. 1, system 100 includes a plurality of wireless devices 102 connected as a mesh network. Each wireless device includes a routing table 104 used to select the route on which to transmit a packet.

In one embodiment, when a device in a mesh network is selected as part of a route from a source to a destination, the routing table 104 logs such information as source, destination, a received signal strength index (RSSI), and other data that may be referred to generically as link quality. When the device has been selected more than once for additional source-to-destination routes, the routing table 104 will likewise log the each additional source-to-destination route. With each additional route that uses the node, the routing table 104 has one less space to record the necessary data than just before a new route was secured through that node.

As noted above, it can be a problem to select routes based on the RSSI of your nearest neighbors. To counter that, in one embodiment the route selection criteria is modified to limit the degree by which one device fills its routing table more quickly than its neighbors. In one such embodiment, the route selection criteria continues to rely on link quality to select the best neighbor during route discovery, but it improves routing table utilization by taking into account the routing table capacity of the neighbors at the time of route discovery.

In one such embodiment, each broadcast route request (discovery) packet (BRRP) and each unicast route reply (response) packet (URRP) includes a link quality field that is also logged in the routing table 104. In an embodiment, the link quality field is a combined metric that indicates both the quality of an overall routing path as it is established from source to destination, and the degree to which the given routing table 104 is filled with subsequent routing data.

In an embodiment, when a device receives a broadcast route request packet (BRRP), and it is not the destination device, it reads the link quality field and modifies it based on the routing entry capacity of the routing table 104 and on other link-quality criteria. The device inserts this adjusted link quality field into the route request and rebroadcasts it. When the destination device receives a broadcast route request packet (BRRP), it evaluates the link quality field. If the received route request packet has the best link quality criteria of any route request packet received to date, it sends a route reply to the device it received the route request from. Otherwise, if the link quality metric in the received route request is worse than the best received link quality, the route request is discarded.

The criteria used by a device to set the link quality field influence how routes are created in a network. In one embodiment, the routing table 104 modifies the link quality criteria based in part upon the amount of room in routing table 104 (i.e., the degree to which routing table 104 has been filled with established routes in the mesh network).

In one example embodiment, link-quality selection criteria choose a device based on the RSSI of the device and also on the degree to which the routing table 104 of the device is occupied with other routing data. As noted above, if a given device has better RSSI than an immediate or nearby neighboring device in a route discovery, the device is oftentimes selected as the best hop, filling its routing table 104 with routes. To counter this, in one example embodiment, the link quality parameter representing the RSSI of the node upstream from the transmitting node is modified as a function of the capacity of the routing table of the transmitting node before the routing request is rebroadcast. If done correctly, the resulting link quality parameter will push route selection away from the transmitting node when the transmitting node's routing table gets close to full with routing table data.

In one embodiment, when a device receives as route request packet, and it is not the intended destination, it modifies the link quality field based on both RSSI and an adjustment factor that reflects the node's routing table capacity. If the node has an empty routing tables, no adjustment factor is needed. If, however, the routing table is close to filling up, the node adds an adjustment factor to make the link quality metric look worse. For example, a node with a routing table having ten unused entries would add a slight factor to its link quality metric, while the same node with a routing table having only 3-4 remaining entries would add a factor to make the node look like a less attractive candidate for the route. By worsening the link quality value as a device's routing table 104 fills, other neighboring devices begin to look more attractive, despite the fact that they may have a lower RSSI. This effectively distributes route selection among multiple devices in a particular area.

Figure 2:
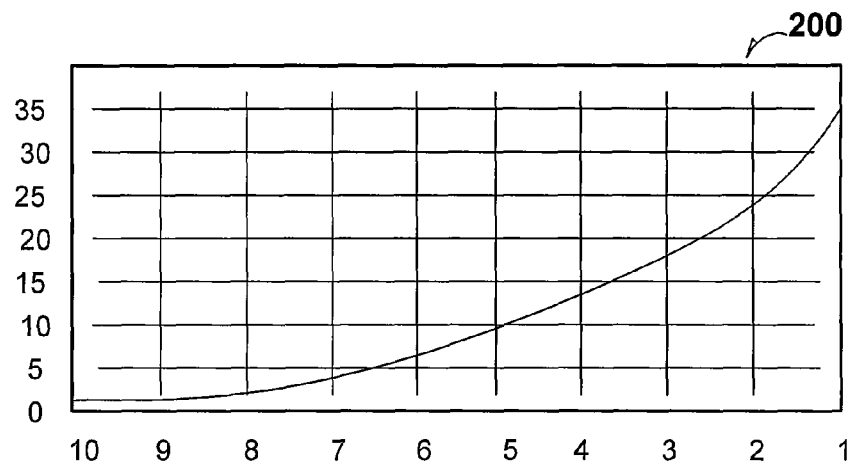
FIGS. 2-6 illustrate different approaches to modifying the link quality metric parameter.

FIG. 2 is a graphical representation 200 of how a link quality offset is calculated in one embodiment as a function of the number of remaining routing table entries in a given node's routing table 104. In the example shown, the link quality offset increases exponentially as the number of open routing table entries dwindle to one. This makes each node less attractive a candidate for routing as its routing table 104 fills.

Accordingly, where the routing table 104 has 10 routing spaces remaining, the content of the link-quality field is degraded as a function of an arbitrary factor of, in this example, one. Further in an example from FIG. 2, where the routing table 104 has 8 routing spaces remaining, the content of the link-quality field is degraded as a function of an arbitrary factor of 2. Further in an example from FIG. 2, where the routing table 104 has 6 routing spaces remaining, the content of the link-quality field is degraded as a function of an arbitrary factor of 6. Further in an example from FIG. 2, where the routing table 104 has 4 routing spaces remaining, the content of the link-quality field is degraded as a function of an arbitrary factor of 14. Further in an example from FIG. 2, where the routing table 104 has 2 routing spaces remaining, the content of the link-quality field is degraded as a function of an arbitrary factor of 24. And finally in an example from FIG. 2, where the routing table 104 has only one routing space remaining, the content of the link-quality field is degraded as a function of an arbitrary factor of 35.

By adding an adjustment factor to the link quality measurement that is weighted as a function of the number of remaining unused routing table entries, the device still responds as a possible candidate in establishing a route, but the worsened link quality metric makes it appear to be a worse candidate than would be suggested by its RSSI, distributing the routing load across nodes with lower RSSI but more routing table entries.

This method also allows what may be an efficient route through the device that contains the routing table 104 to virtually fill but also to cause a given BRRP to select another device when the state of the routing table on the transmitting node indicates that capacity is being approached.

Figure 3:
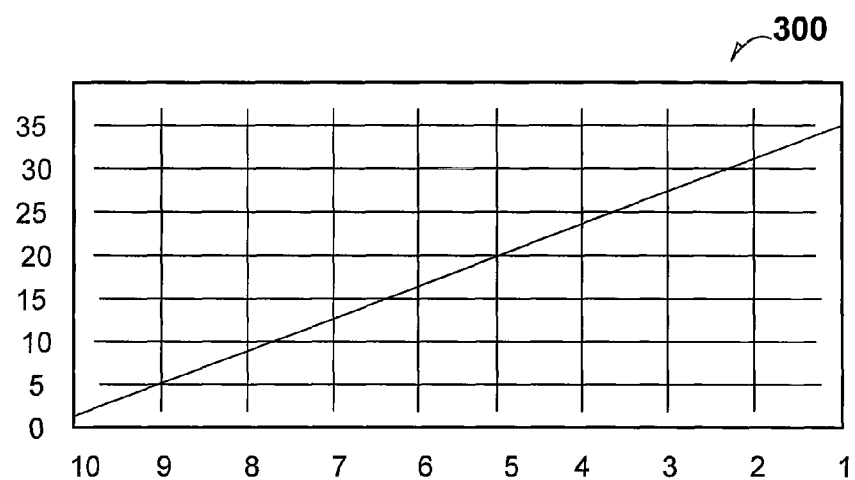

FIG. 3 is a graphical representation 300 of a linear link quality response element according to an embodiment.

In an embodiment, the linear modified-link quality approach allows the routing table 104 to fill up linearly if it is chosen repeatedly over neighboring devices, but when the routing table approaches "full", modified-link quality returns a "bad link choice" message to a broadcast route request packet (BRRP). Consequently, while the routing table 104 in such a scenario fills up, a delayed "bad link choice" allows neighboring devices to take on some of the routing burden.

Figure 4:
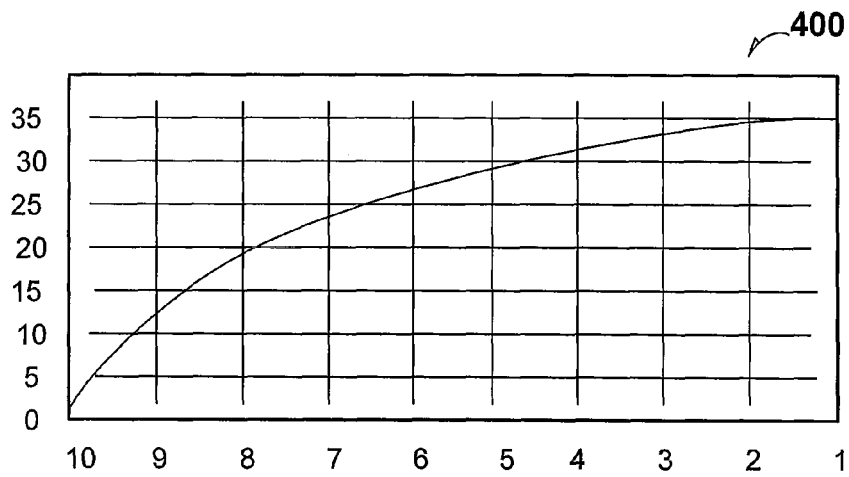

FIG. 4 is a graphical representation 400 of a parabolic link quality response according to an embodiment.

In an embodiment, the linear modified-link quality approach allows the routing table 104 to fill up as shown in FIG. 4 if a node is chosen repeatedly over neighboring devices. When the routing table approaches "half full", modified-link quality returns a "bad link choice" message to a broadcast route request packet (BRRP), but the "worst link" message is delayed until that routing table 104 is completely full. Consequently, while the routing table 104 in such a scenario fills up, a delayed "bad link choice" allows neighboring devices to take on some of the routing burden.

Figure 5:
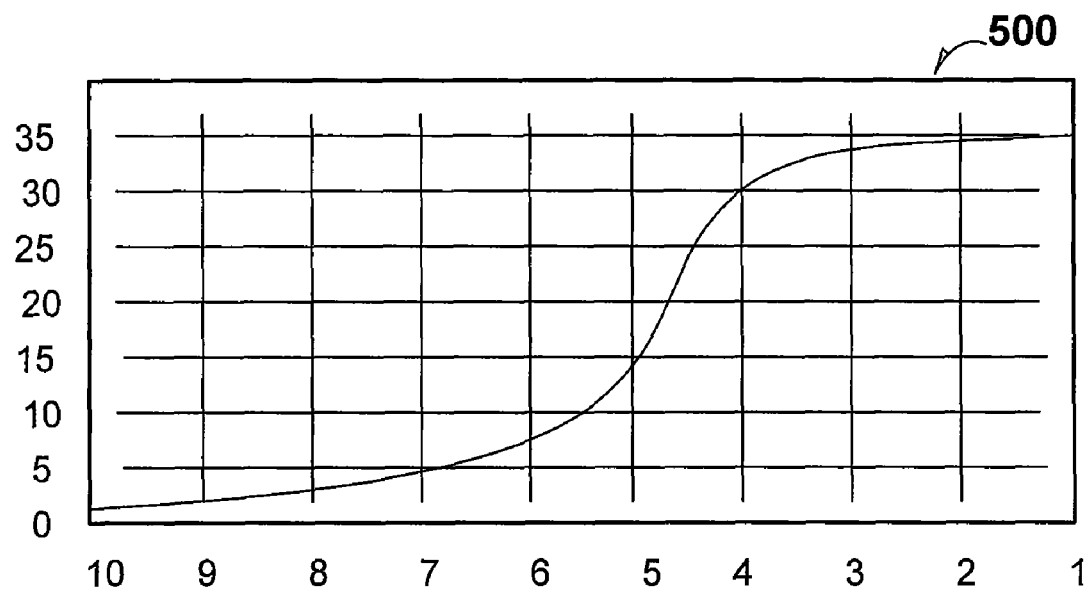
Figure 6:
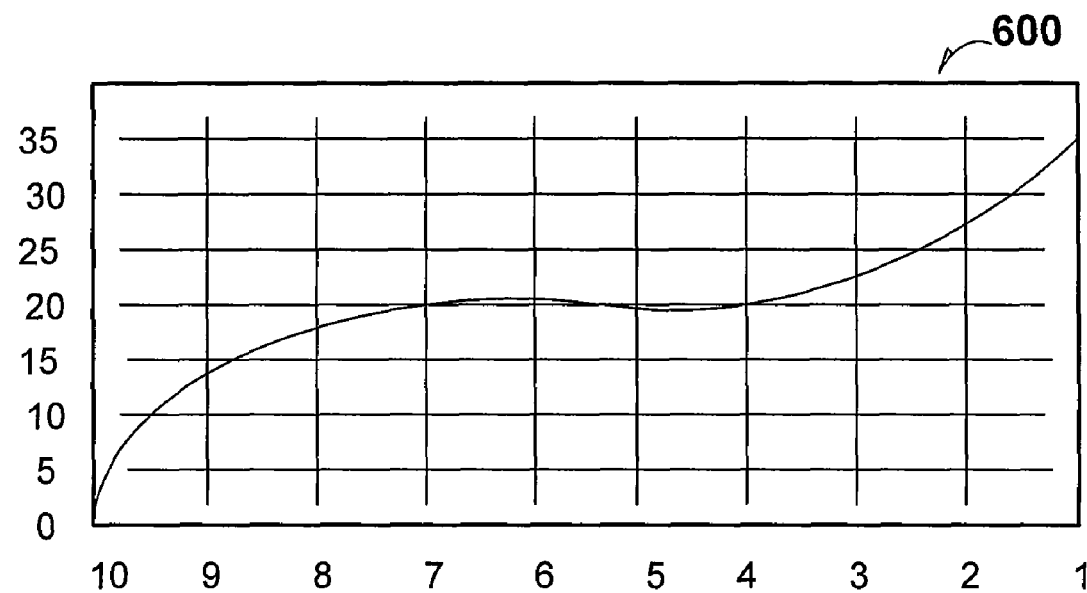

FIGS. 5 and 6 illustrate other approaches to tuning distribution of routes across nodes in mesh network 100. Other scenarios are available as well to modify a link quality metric for a given data table. Consequently, better distribution of route selection amongst multiple devices during route discovery prevents one device from filling to capacity before allowing route selections to devolve upon neighboring devices. The method embodiments rely on link quality to select the best neighbor during route discovery, but the embodiments modify the link-selection algorithm to establish route distribution that reduces the probability of a routing table from filling up and causing an established link from being overwritten before neighboring devices are significantly used to capacity.

Accordingly, routes are created in a modified AODV mesh network that uses both RSSI and routing table capacity from neighboring devices over time with periodic transmissions. The RSSI of each neighboring device may also be modified only during the route discovery. The RSSI is translated into a link quality metric, or what is a link cost value. In contrast, typical ZigBee solutions rely only on link quality and assume that selecting the neighbor with the best link quality is the best way to select a route.

The several embodiments create a modified "link quality" calculation. When a device receives a route request packet, and it is not the intended destination, it modifies the link quality field based on RSSI and an adjustment factor based on the state of its routing table. By adding an adjustment factor to the link quality measurement that is weighted according to the number of remaining unused routing table entries, the device responds as a possible candidate in establishing a route, but the worsened link quality makes it appear worse to devolve the established link to neighboring nodes to be selected for new routes. This approach effectively distributes the routing load amongst multiple neighboring.

One facet of these embodiment is that routers adjust their link quality metric in route discovery based on the capacity of their routing tables to better distribute the routing burden amongst neighboring devices to reduce collisions and improve routing table longevity.

Figure 7:
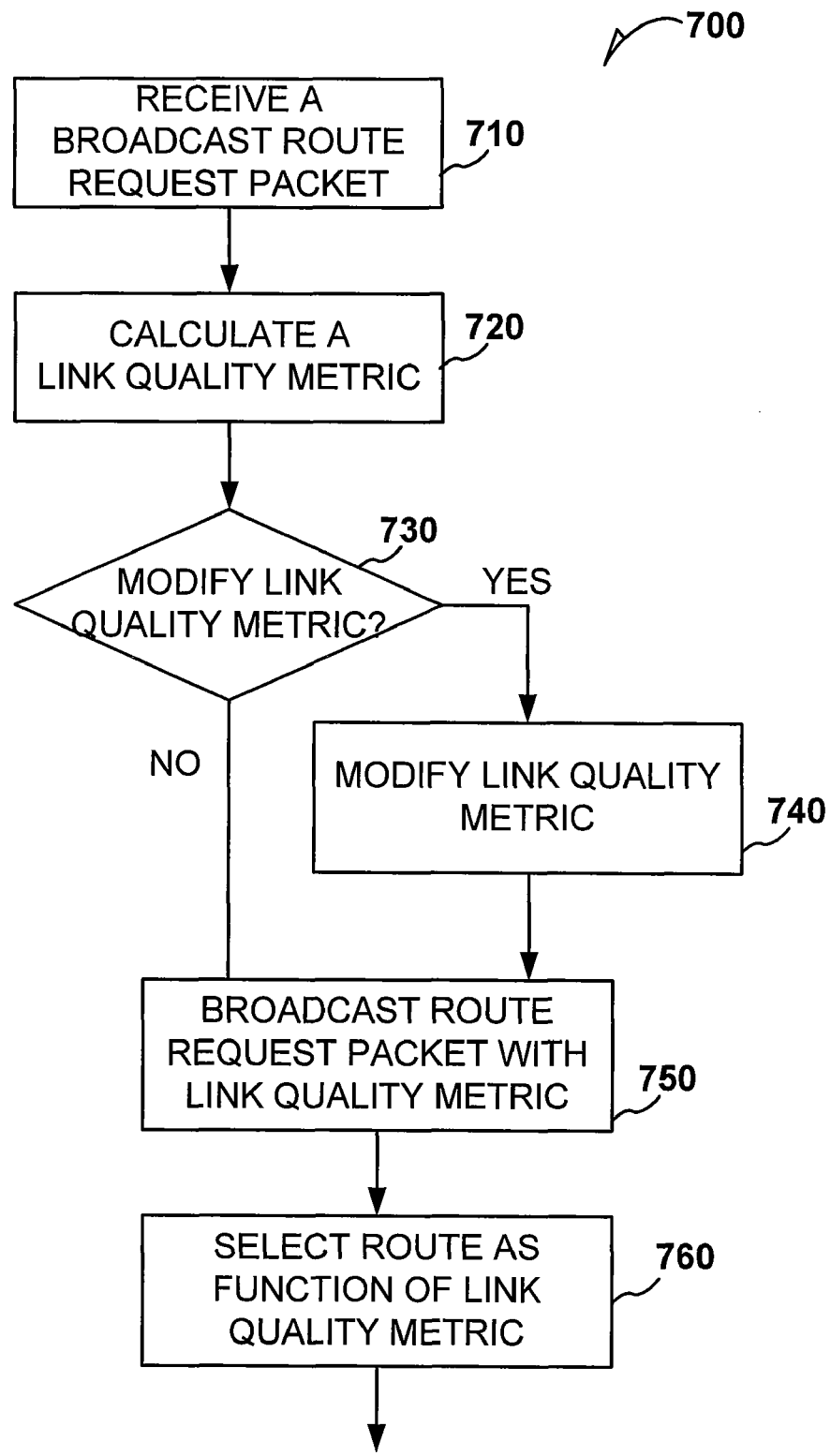
FIG. 7 is a method of selecting a route according to an embodiment.

FIG. 7 is a method flow 700 according to an embodiment.

At 710, the method includes receiving a broadcast route request packet (BRRP) at a given device.

At 720, the given device calculates a link quality metric representative of at least the link quality of the transmission from the transmitting node. In one embodiment, the link quality metric also takes into account the link quality measurements from nodes further upstream from the transmitting node.

At 730, a determination is made whether it is necessary to modify the link quality metric to reflect the remaining capacity in the node's routing table. In one embodiment, the decision to modify the link quality metric is made when the number of entries in the routing table pass a certain threshold.

At 740, the link quality metric is modified as a function of the remaining capacity in the routing table. In some such embodiments, as is shown in FIGS. 2-6, as the number of entries continues to increase, the amount of modification to the link quality metric increases as well by a predefined amount. Control then moves to 750.

At 750, the node rebroadcasts the broadcast route request packet with its new link quality metric.

At 760, the broadcast route request packet reaches its destination node and a new route is enabled if the route has a better link quality metric than the previous routes.

Figure 8:
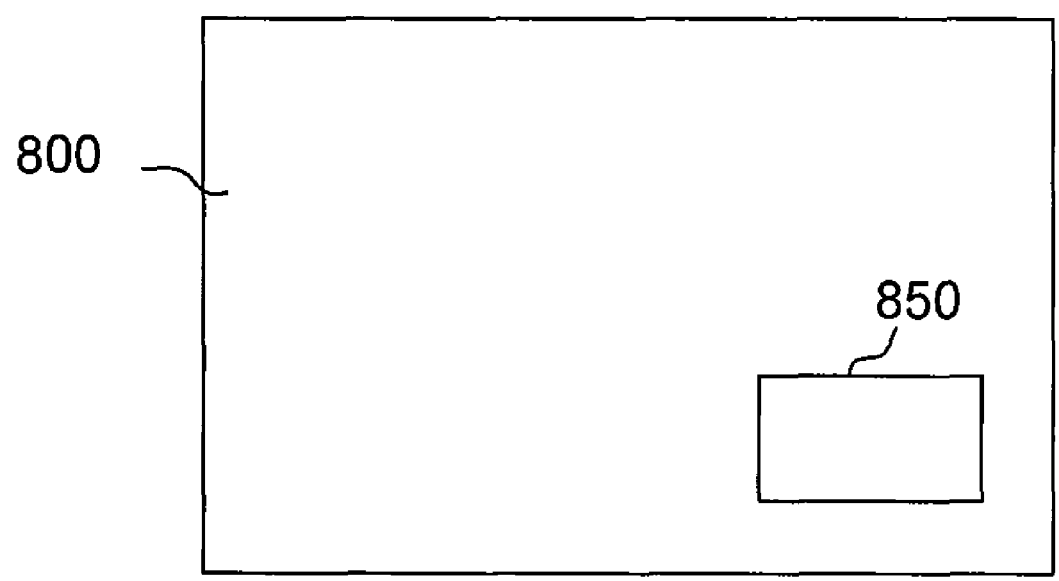
FIG. 8 is a schematic diagram illustrating a medium having an instruction set, according to an example embodiment, that forms a weighted link quality factor to be sent in a unicast route reply packet in a mesh network according to an embodiment.

FIG. 8 is a schematic diagram illustrating a medium having an instruction set, according to an example embodiment, that forms a weighted signal strength factor for use in a mesh network according to an embodiment. A machine-readable medium 800 includes any type of medium such as a link to the Internet or other network, or a disk drive or a solid state memory device, or the like. A machine-readable medium 800 includes instructions within an instruction set 850. The instruction set 850, when executed by a machine such as an information handling system or a processor, cause the machine to perform operations that include modifying the link-quality metric as part of route discovery.

Although the various weighted link-quality metrics to be used in route discovery have been described with reference to specific example embodiments, it will be evident that various modifications and changes may be made to these embodiments without departing from the broader scope of the disclosed subject matter. Accordingly, the specification and drawings are to be regarded in an illustrative rather than a restrictive sense.

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that the disclosed embodiments be limited only by the claims, and the full scope of equivalents thereof.

What is claimed is:

1. In a mesh network having a plurality of wireless nodes, including a first, second, third and fourth node, wherein each node includes a routing table, a method of route discovery, comprising:

broadcasting a first route request message from the first node;

receiving the first route request message at the second and third nodes;

calculating, in the second node, a link quality metric as a function of link quality of the link to the first node and as a function of capacity in the routing table of the second node;

calculating, in the third node, a link quality metric as a function of link quality of the link to the first node and as a function of capacity in the routing table of the third node;

broadcasting a second route request message from the second node, wherein the second route request message includes the link quality metric calculated by the second node;

broadcasting a third route request message from the third node, wherein the third route request message includes the link quality metric calculated by the third node;

receiving, at the fourth node, the second and third route request messages; and selecting a route path as a function of the link quality metric calculated by the second node and the link quality metric calculated by the third node.

2. The method of claim 1, wherein the link quality metric is a function of the received signal strength (RSSI) of the first route request message.

3. The method of claim 1, wherein the link quality metric is a function of the silence value associated with the first route request message.

4. The method of claim 1, wherein calculating a link quality metric at the second node includes determining a link quality value reflective of the link quality of the link to the first node and modifying that link quality value as a function of a parameter that changes as a function of the number of empty slots in the routing table.

5. The method of claim 4, wherein the link quality metric is a function of the received signal strength (RSSI) of the first route request message.

6. The method of claim 4, wherein the link quality metric is a function of the silence value associated with the first route request message.

7. The method of claim 1, wherein calculating a link quality metric at the second node includes determining a link quality value reflective of the link quality of the link to the first node and modifying that link quality value as a function of a parameter that changes as a function of the number of empty slots in the routing table, wherein the parameter is selected to encourage distribution of routes across multiple nodes.

8. The method of claim 1, wherein the link quality metric at the second node includes a first and a second metric value, wherein determining the first metric value includes determining a link quality value reflective of the link quality of the link to the first node and wherein determining the second metric value includes determining a parameter that changes as a function of the number of empty slots in the routing table.

9. The method of claim 8, wherein the first metric value is a function of the received signal strength (RSSI) of the first route request message.

10. The method of claim 8, wherein the first metric value is a function of the silence value associated with the first route request message.

11. An article comprising a non-transitory computer readable medium having instructions thereon, wherein the instructions, when executed by a machine, create a system for executing the method of claim 1.

12. A system, comprising:
a plurality of wireless devices, wherein each wireless device includes a radio transmitter, a radio receiver and a routing table;
wherein the wireless devices form a routing-table-based mesh network;
wherein each wireless device includes means for calculating a link quality metric as a function of link quality of a link between the radio receiver of the wireless device and a radio transmitter on another wireless device and further as a function of capacity in the routing table of the particular wireless device; and
wherein route discovery is performed as a function of the link quality metric.

13. The system of claim 12, wherein the routing-table-based mesh network is an ad-hoc on-demand distance vector (AODV)-based network.

14. The system of claim 12, wherein the link quality metric is a function of the received signal strength (RSSI) of a route request message received from another wireless device.

15. The system of claim 12, wherein the link quality metric is a function of the silence value of a route request message received from another wireless device.

16. The system of claim 12, wherein the means for calculating a link quality metric includes means for determining a link quality value reflective of the link quality of the link to the other node and means for modifying that link quality value as a function of a parameter that changes as a function of the number of empty slots in the routing table of the wireless device.

17. The system of claim 16, wherein the link quality metric is a function of the received signal strength (RSSI) of a route request message received from another wireless device.

18. The system of claim 16, wherein the link quality metric is a function of the silence value of a route request message received from another wireless device.

* * * * *